United States Patent [19]
Hsieh

[11] Patent Number: 6,128,387
[45] Date of Patent: Oct. 3, 2000

[54] METHOD AND SYSTEM FOR USING A NON-INVERSIBLE TRANSFORM AND DYNAMIC KEYS TO PROTECT FIRMWARE

[75] Inventor: Hsun-Chang Hsieh, Hsinchu, Taiwan

[73] Assignee: Industrial Technology Research Institute, Hsinchu, Taiwan

[21] Appl. No.: 08/858,252

[22] Filed: May 19, 1997

[51] Int. Cl.$^7$ ........................................... H04K 1/00
[52] U.S. Cl. ................................. 380/44; 380/28
[58] Field of Search .................. 380/28, 29, 44, 380/46

[56] References Cited

U.S. PATENT DOCUMENTS

| | | | |
|---|---|---|---|
| 4,160,120 | 7/1979 | Barnes et al. | 380/29 |
| 4,172,213 | 10/1979 | Barnes et al. | 380/29 |
| 4,933,971 | 6/1990 | Bestock et al. | 380/29 |
| 5,163,097 | 11/1992 | Pegg | 380/44 |
| 5,195,136 | 3/1993 | Hardy et al. | |
| 5,222,141 | 6/1993 | Killian | |
| 5,231,662 | 7/1993 | van Rumpt et al. | |
| 5,703,948 | 12/1997 | Yanovsky | 380/46 |
| 5,841,873 | 11/1998 | Lockhart et al. | 380/44 |

*Primary Examiner*—Salvatore Cangialosi
*Attorney, Agent, or Firm*—Christensen O'Connor Johnson & Kindness, PLLC

[57] ABSTRACT

The present invention discloses a method and system to encrypt an object code using a non-inversible transform and dynamic keys in an encryption circuit and an decryption circuit. The encryption circuit operates to encrypt an object code to an encrypted code using a sequence of dynamic keys which possess non-inversible transform characteristics. Similarly, the decryption circuit operates to decrypt the encrypt code using a sequence of dynamic keys which possess non-inversible transform characteristics. The sequence of dynamic keys change in accordance to a timing index in which a different key is generated for a different timing cycle. In one embodiment, the decryption circuit contains a transform circuit U to transform the encrypted code back to the object code. In another embodiment, the transform circuit U is partitioned into a resident device and mobile device.

24 Claims, 6 Drawing Sheets

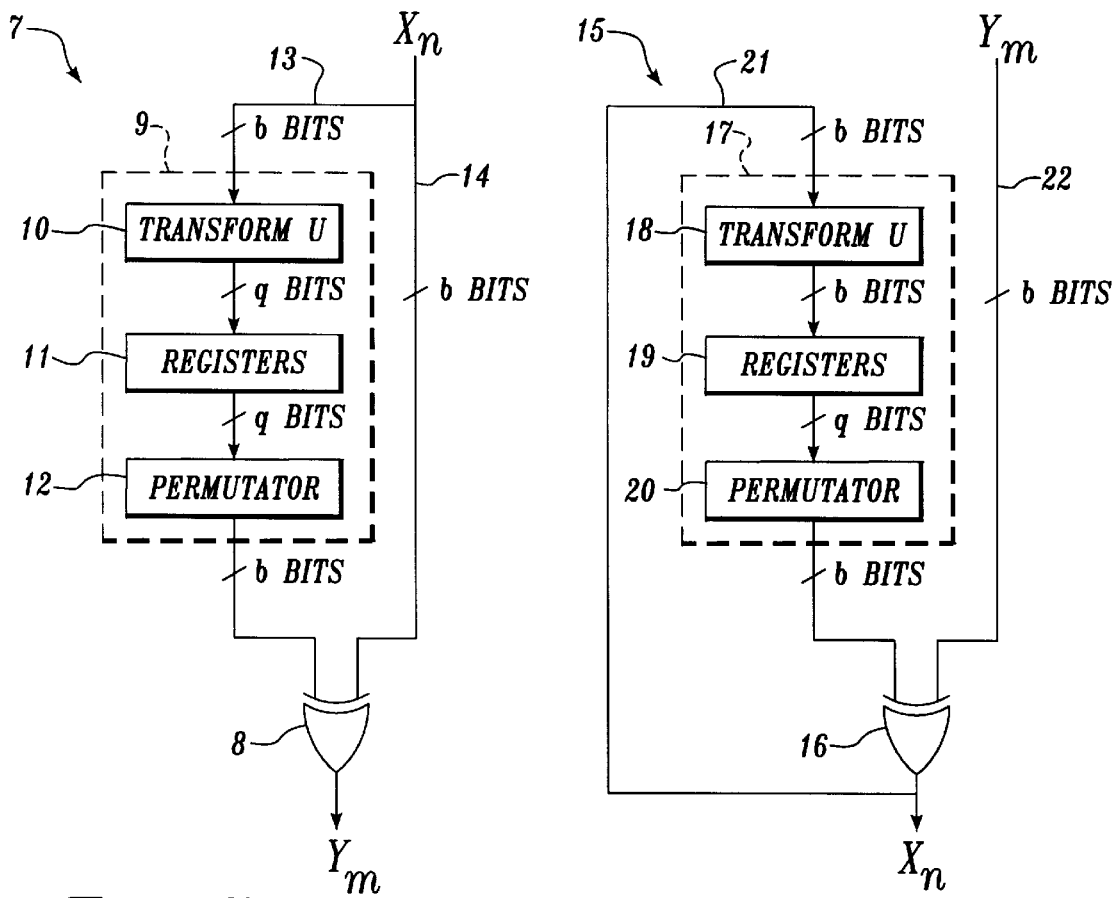
*Fig. 5.*   *Fig. 6.*
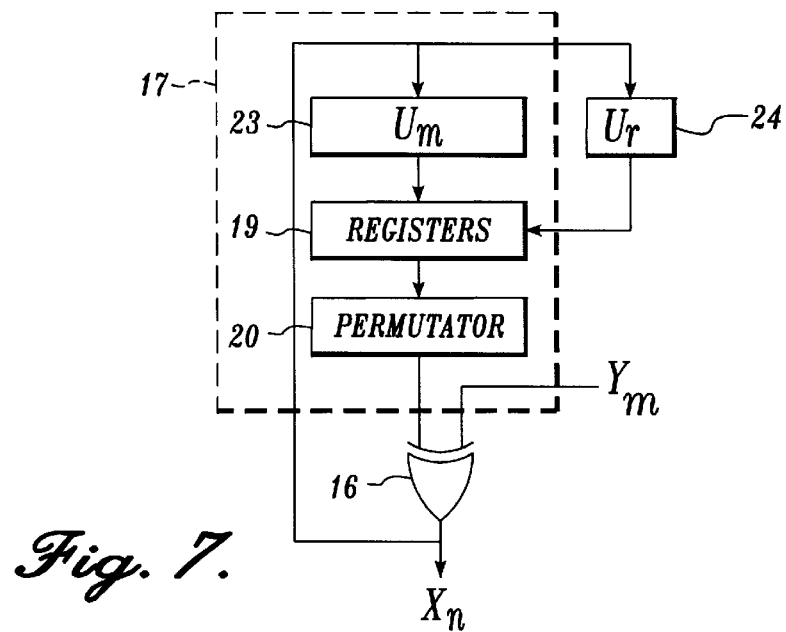
*Fig. 7.*

| BITS | 1 | 2 | 3 | 4 | 5 | 6 | 7 | 8 |
|---|---|---|---|---|---|---|---|---|
| BIT REVERSE | 2 | 4 | 8 | 16 | 32 | 64 | 128 | 256 |
| INVERSIBLE TRANS. | 2 | 24 | 4.0320E4 | 2.0932E13 | 2.6313E35 | 1.2689E89 | 3.8562E215 | 8.5782E506 |
| NON-INVERSIBLE TRANS. | 2 | 232 | 1.6737E7 | 1.8447E19 | 1.4615E48 | 3.9402E115 | 5.2829E269 | 3.2317E616 |
| THE INVENTION | 4 | 928 | 1.3390E8 | 2.9515E20 | 4.6768E49 | 2.5217E117 | 3.2317E271 | 3.4324E618 |

Fig. 13

METHOD AND SYSTEM FOR USING A NON-INVERSIBLE TRANSFORM AND DYNAMIC KEYS TO PROTECT FIRMWARE

FIELD OF THE INVENTION

The present invention relates generally to cryptography, and more particular to encrypting and decrypting object codes in firmware.

BACKGROUND OF THE INVENTION

Cryptography has became increasingly important in protecting firmware, program, and data with the rapid development of the information superhighway, the Internet, and the World Wide Web. Many of the well known cryptographic methods have been based on mathematical-intensive calculations, such as the RSA and Deffie-Hellman approaches, and not based on the design of digital electronics. The digital electronics approach seeks to protect firmware, program, and data with similar qualities and desirable characteristics as the RSA and Deffie-Hellman approaches. A desirable cryptographic approach encrypts and decrypts information quickly to minimize delays that occurs during the computation process while providing a high degree of security, such using multiple decryption keys, to withstand cryptoanalytic attacks.

FIGS. 1A–1B show a bit reverse ciphering technique for encrypting object codes and decrypting encrypted codes. The bit reverse ciphering technique uses an exclusive-OR operator for both the encrypting and decrypting processes. The exclusive-OR operator produces the same Boolean equation for taking an exclusive-OR operation of a first variable and a second variable to produce a result Y, and for taking the result Y and the second variable to obtain back the value of the first variable. In FIG. 1A, the object code $X_n$ is encrypted to an encrypted code $Y_n$ by an encrypted key $k_o$ by the Boolean equation: $Y_n = X_n \oplus k_0$, where n=1, . . . , N. In FIG. 1B, the object code $X_n$ is retrieved by taking an exclusive-OR of $Y_n$ and $k_0$ as denoted by the Boolean equation: $X_n = Y_n \oplus k_o$, where n=1, . . . , N. The selection of the common Boolean operator for both the encryption process and decryption process reduces the complexity of the implementation while minimizes the delay in decoding the encrypted codes. However, the bit reverse ciphering technique is quite susceptible upon cryptoanalytic attack. A short key $k_0$ can be easily decrypted by trying different possible permutations. Even if a key is constructed using a long string of object codes, the key is still not difficult to decrypt by using a probability density function to decrypt the encrypted code. Thus, the bit reverse ciphering technique is not desirable to protect object codes from intruders.

FIGS. 2A–2B show an inversible transform technique that is more difficult to decrypt than the bit reverse ciphering technique. The object code $X_n$ is encrypted to an encrypted code $Y_n$ by taking the transform of $X_n$, represented by the equation $Y_n = T(X_n)$. The transform T is selected as having a corresponding inverse transform as denoted by $T^{-1}$. Correspondingly, the object code $X_n$ can be decrypted from the encrypted code $Y_n$ from the equation $X_n = T^{-1}(Y_n)$. In the inversible transform ciphering technique, the process of encrypting an object code $X_n$ is different from the process of decrypting an encrypted code $Y_n$. The following example illustrates this difference. For a first sequence of codes $X_n$, where n=0, 1, 2, . . . , 7, that transforms to a second sequence of codes $Y_n$, where n=0, 1, 2, . . . , 7, the transform T is characterized as follows:

000 to 001
001 to 101
010 to 111
011 to 011
100 to 110
101 to 000
110 to 100
111 to 010

The inversible transform ciphering technique has the characteristics of one-to-one mapping, which makes it vulnerable upon cryptoanalytic attach. The inversible transform may be decrypted by monitoring the statistic occurrence of codes to find the inverse transform by comparing the frequency of occurrence of the encrypted code $Y_n$ to the object code $X_n$. For example, in a 3-bit binary string, the binary code "111" has the highest probability of occurrence relative to the other 3-bit binary codes. If the binary code "111" is mapped to the binary code "010", the binary code "010" in the encrypted domain retains the characteristics of the highest probability of occurrence as derived from the binary code "111". By observing the occurrence of codes, an intruder may be able to decrypt the mapping relationship between the object code $X_n$ and the encrypted code $Y_n$. Therefore, the inversible transform ciphering technique is also vulnerable upon cryptoanalytic attach.

As shown in FIGS. 3A–3B, a non-inversible ciphering technique provides another alternative to protect an object code $X_n$ without subjecting the object code $X_n$ to be decrypted by statistical occurrence. The non-inversible ciphering technique provides high security to object codes $X_n$ because it does not have an one-to-one mapping relationship between the object code $X_n$ and the encrypted code $Y_n$. Although the non-inversible ciphering technique provides high security to protect the object code $X_n$, this technique does not have a corresponding inverse transform to decrypt the encrypted code $Y_n$ back to the object code $X_n$. Without a corresponding inverse transform, the object code $X_n$ cannot be recovered on the basis of knowing the encrypted code $Y_n$, and therefore, the non-inversible ciphering technique is not suitable to protect object codes in firmware, program, or data.

Accordingly, it is desirable to have a method and system for encrypting object codes and decrypting encrypted codes using a non-inversible transform.

SUMMARY OF THE INVENTION

The present invention discloses a method and system to encrypt an object code using a non-inversible transform and dynamic keys in an encryption circuit and an decryption circuit. The encryption circuit operates to encrypt an object code to an encrypted code using a sequence of dynamic keys which possess non-inversible transform characteristics. Similarly, the decryption circuit operates to decrypt the encrypt code using a sequence of dynamic keys which possess non-inversible transform characteristics.

Two types of keys are used to encrypt object codes and to decrypt encrypted codes. The first one is the single key $X_0$, and the second one is a sequence of dynamic keys $k_n$ which possesses non-inversible transform characteristics. The single key $X_0$ is known by both the encryption circuit and the decryption circuit. In addition, the decryption circuit must contain the same type of transform used by the encryption circuit to transform the object code. The sequence of dynamic keys $k_n$ changes in accordance to a timing index in which a different key is computed for a different timing cycle. The dynamic key is generated by a non-inversible transform T on an object code $X_n$.

The encryption circuit contains a transform circuit U to transform an object code to an encrypted code and the decryption circuit also contains a transform circuit U to transform the encrypted code back to the object code. The transform circuit U can be implemented in various computer hardware, including ROMs, PLAs, and combinatorial logic. The transform circuit U is partitioned into two sections, with the first section called a mobile device $U_m$ and the second section called a resident device $U_r$. The mobile device $U_m$ typically holds a smaller portion of the transform circuit U so that it can be manufactured within a compact dimension. The mobile $U_m$ unit is designed to be a removable unit, but it can also be a stationary unit. The resident device $U_r$ holds the majority of the logic circuits in the transform circuit U.

One advantage of the present invention is that the present method and system increases the complexity of the permutations and thus increase the protection to withstand upon cryptoanalytic attach. If an object code $X_n$ contains b bits, then the bit reverse method provides $2^b$ possible combinations of keys. The inversible transform method offers greater resistance from its one-to-one mapping scheme with $2^b!$, or $2^b \times (2^b-1) \times (2^b-2) \ldots 2 \times 1$ permutations of keys. Although the non-inversible transform method offers even greater resistance with the $2^{b2^b}-2^b!$ permutations, the non-inversible transform method cannot be used to encrypt an object code since no inverse transform exists to decrypt the encrypted code back the object code. The present invention offers greater resistance to withstand upon cryptoanalytic attach having permutations of $2^b\{2^{b2^b}-2^b!\}$, which represents the bit reverse method combinations of $2^b$, combine the non-inverse transform combinations of $(2^{b2^b})$, minus the inversible transform combinations of $2^b!$.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 5 is a schematic diagram of the encryption circuit to encrypt an object code to an encrypted code.

FIG. 6 is a schematic diagram of one embodiment of the decryption circuit to decrypt the encrypted code back to an object code.

FIG. 7 is a schematic diagram of the second embodiment of the decryption circuit with a mobile transformer device and a resident transform device.

FIG. 13 is a table showing the permutations from one-bit to eight-bit for a bit reverse technique, an inversible transform technique, a non-inversible transform, and the present method and system.

DETAILED DESCRIPTION OF THE PREFERRED EMBODIMENT

Figure 1A:
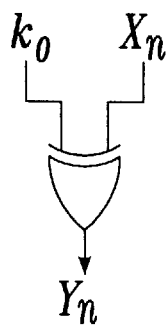
FIGS. 1A–1B are schematic diagrams for encrypting object codes to encrypted codes and decrypting encrypted codes back to object codes using a bit reverse ciphering technique.
Figure 1B:
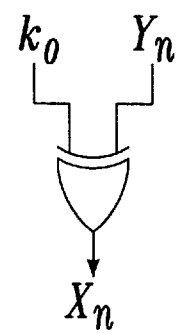
Figure 2A:
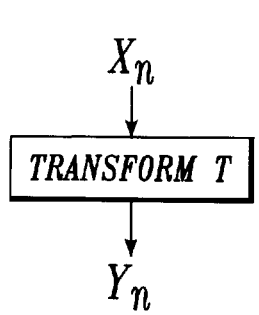
FIGS. 2A–2B are schematic diagrams for encrypting object codes to encrypted codes and decrypting encrypted codes back to object codes using an inversible transform ciphering technique.
Figure 2B:
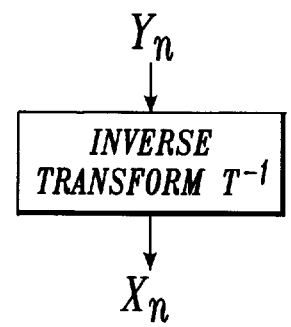
Figure 3A:
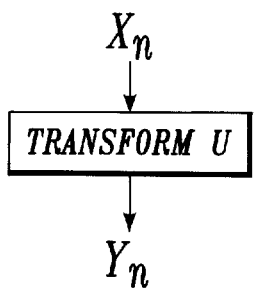
FIGS. 3A–3B are schematic diagrams for encrypting object codes to encrypted codes and decrypting encrypted codes back to object codes using a non-inversible transform technique.
Figure 3B:
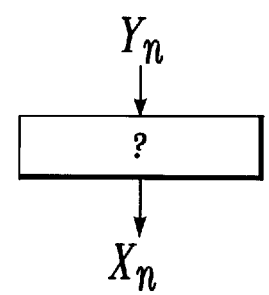
Figure 4:
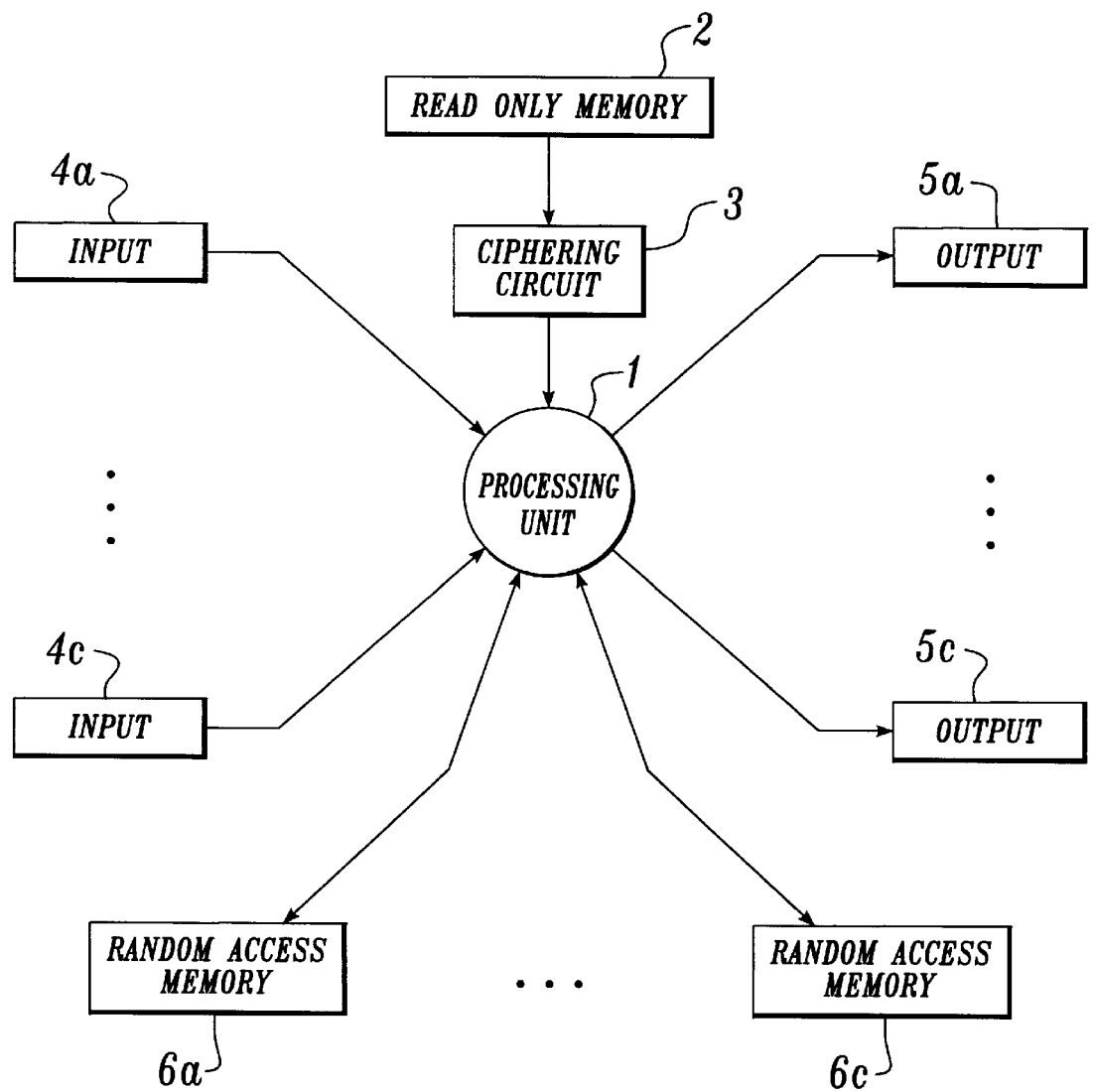
FIG. 4 is a schematic diagram for encrypting object codes and decrypting encrypted codes using a non-inversible transform and dynamic keys in the present invention.

Referring now to FIG. 4, there is shown a schematic diagram for encrypting an decryption an object code using the non-inversible transform and dynamic keys of the present invention. A processing unit 1 couples to a read only memory 2 through a ciphering circuit 3. The ciphering circuit 3 operates as a security link to safeguard the accessing of the object code from the processing unit 1. The processing unit 1 further couples to other electrical devices, such as input devices 4a–4c, output devices 5a–5c, and random access memories 6a–6c.

In FIG. 5, there is shown a schematic diagram of an encryption device. The encryption circuit 7 includes an exclusive-OR logic gate 8 and a transform circuit 9 containing a transform U device 10, a set of registers 11, and a permutator 12. Object code $X_n$ feeds through a first path 13 through the transform U device 10, the set of registers 11, and the permutator 12 to the exclusive-OR gate 8. The transform U device 10 transforms a first set of binary numbers $X_n$ to a second set of binary numbers $Z_m$, where $X_n=\{X_0, X_1, \ldots, X_n\}$ and $Z_m=\{Z_0, Z_1, \ldots, Z_m\}$. The transform U device 10 possesses a non-inversible transform characteristics such that the numerical value of m is less than the numerical value of n, and the mapping of $X_n$ to $Z_m$ constitutes a multiple-to-one mapping, i.e. not one-to-one mapping. For example, if $\{X_0, X_1, X_2, X_3, X_4, X_5,$ and $X_6\}$ maps to $\{Z_1\}$, there exists no inverse transform mapping from $Z_1$ back to $X_n$ domain. Therefore, the transform U device 10 produces a non-inversible transform for encrypting an object code $X_n$ to an encrypted code $Z_m$.

The set of registers 11 contains $X_{n-1}$ registers and provides one-clock-cycle timing delays to the permutator 12. The permutator 12 converts the encrypted code with q bit-width to a permutated code with b bit-width. Object code $X_n$ feeds through a second path 14 directly to the exclusive-OR gate 8. The exclusive-OR gate 8 computes the Boolean logical operation of these two inputs with the equation $Y_n=X_n \oplus U(X_{n-1})$ to generate an encrypted code of $Y_n$, where $Y_n$ contained a series of binary numbers as represented by $Y_m=\{Y_0, Y_1, \ldots, Y_n\}$.

FIG. 6 is a schematic diagram of a decryption circuit. Similar to the encryption circuit 7, the decryption circuit 15 includes an exclusive-OR logic gate 16 and a transform circuit 17 containing a transform U device 18, a set of registers 19, and a permutator 20. Object code $X_n$ feeds through a first path 21 through the transform U device 18, the registers 19, and the permutator 20 to the exclusive-OR gate 16. The transform U device 18 transforms a first set of binary numbers $X_n$ to a second set of binary numbers $Y_m$, where $X_n=\{X_0, X_1, \ldots, X_n\}$ and $Y_m=\{Y_0, Y_1, \ldots, Y_m\}$. The transform U device 18 possesses a non-inversible transform characteristics such that the numerical value of m is less than the numerical value of n and the mapping of $X_n$ to $Y_m$ constitutes a multiple-to-one mapping, i.e. not one-to-one mapping. For example, if $\{X_0, X_1, X_2, X_3, X_4, X_5,$ and $X_6\}$ maps to $\{Y_1\}$, there exits no inverse transform mapping from $Y_1$ back to $X_n$ domain. Therefore, the transform U device 18 produces a non-inversible transform of decrypting the encrypted code $Y_n$ back to the object code $X_n$.

The set of registers 19 contains $X_{n-1}$ registers and provide one-clock-cycle timing delays to the permutator 20. The permutator 20 converts the code with q bit-width to a permutated code with b bit-width. The encrypted code $Y_m$ feeds through a second path 22 directly to the exclusive-OR gate 16. The exclusive-OR gate 16 computes the Boolean logical operation of these two inputs with the equation $X_n = Y_m \oplus U(X_{n-1})$ to obtain the object code $X_n$, where $X_n$ contained a series of binary numbers as represented by $X_m = \{X_0, X_1, \ldots, X_m\}$ and where $U(X_{n-1})$ is also denoted by the symbol $Z_m$. Therefore, the encrypted code $Y_m$ has been decrypted to obtain back the object code $X_n$ for retrieving the object code $X_n$ to the processing unit 1.

FIG. 7 is a schematic circuit of the second embodiment of the transform U circuit 17 with a mobile transform device $U_m 23$ and a resident transform device Ur24. The transform U circuit 17 is partitioned into two parts, namely the mobile transform device $U_m 23$ and the resident transform device $U_r 24$. To phrase it in another way, the combination of the mobile transform device $U_m 23$ and the resident transform device $U_r 24$ combines in parts to represent the whole circuitry of the transform U circuit 17. The transform U circuit 17 can be designed using a set of combinatorial logic devices, a ROM, or a PLA. Therefore, in a set of combinatorial logic devices, the mobile transform device $U_m 23$ and the resident transform device $U_r 24$ consists of two sub-set of the combinatorial logic device in the transform U circuit 17. In a ROM or PLA, the mobile transform device $U_m 23$ and the resident transform device $U_r 24$ will be two selected portions of the ROM or PLA, as determined by a designer.

These three implementation approaches, ROm, PLA, or combinatorial logic, can be constructed from a combination of basic logic gates, such as AND gates, OR gates, NOR gates, NAND gates, and XOR gates. A person who possesses ordinary skill in the art would appreciate the many different combinations of the logic devices that can be chosen to implement the design of the mobile transform device $U_m 23$ and the resident transform device $U_r 24$.

Figure 8:
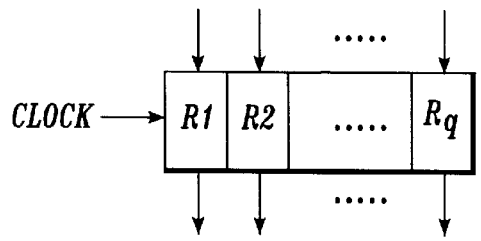
FIG. 8 is a schematic diagram of a set of registers for delaying data.
Figure 9:
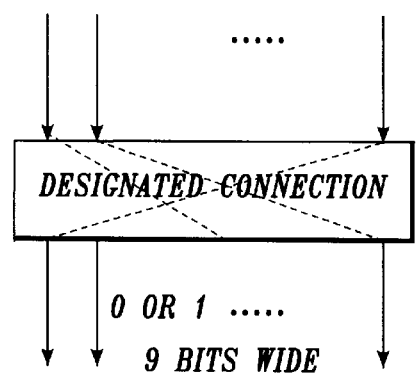
FIG. 9 is an illustrative schematic diagram of the permutator to convert the encrypted code with q bit-width back to the object code with b bit-width.
Figure 10:
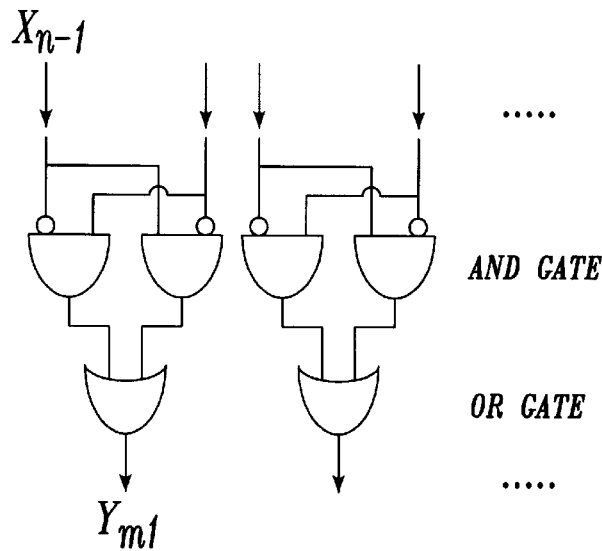
FIG. 10 is a schematic diagram of a plurality of exclusive-OR gates showing the composition for each exclusive-OR gate having a pair of inputs to generate a single output signal.

Turning now to FIG. 8, there is shown a schematic diagram of a set of registers for delaying the data. The length of the registers is determined by the bit-width of q. If q bit is three bits wide, for example, the set of registers would contain R1, R2, and R3 registers to hold the data. These registers are driven by a common clock and provide on-clock-cycle delay before the data is transferred from the transform devices 10 or 18 to the permutators 12 or 20. In FIG. 9, there is shown an illustrative schematic diagram of the permutators 12 or 20 to convert the encrypted code with q bits-width to a permutated codes with p bit-width. The routing connections of the permutators 12 or 20 depend on a preferred design choice. If the bit width of b is larger than the bit width of q, some bit positions of b-bit will be assigned with a logic value of "0" or "1" as fixed values at those bit positions. FIG. 10 is a schematic diagram of a plurality of exclusive-OR gates showing the composition for each exclusive-OR gate having a pair of inputs to generate a single output signal. An exclusive-OR gate ("XOR") having inputs a0 and a1 is represented by a0 XOR a1={NOT a0) (AND a1)} OR {a0 AND (NOT a1)}.

Figure 11A:
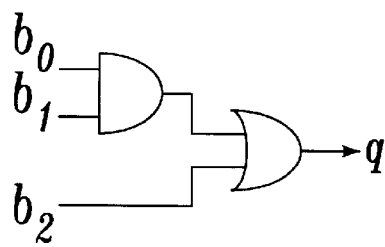
FIGS. 11A–11B show an example of a simple transform circuit and the routing connections in a permutator.
Figure 11B:
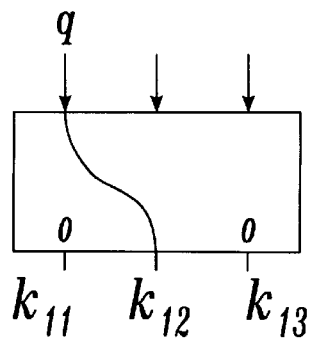
Figure 12:
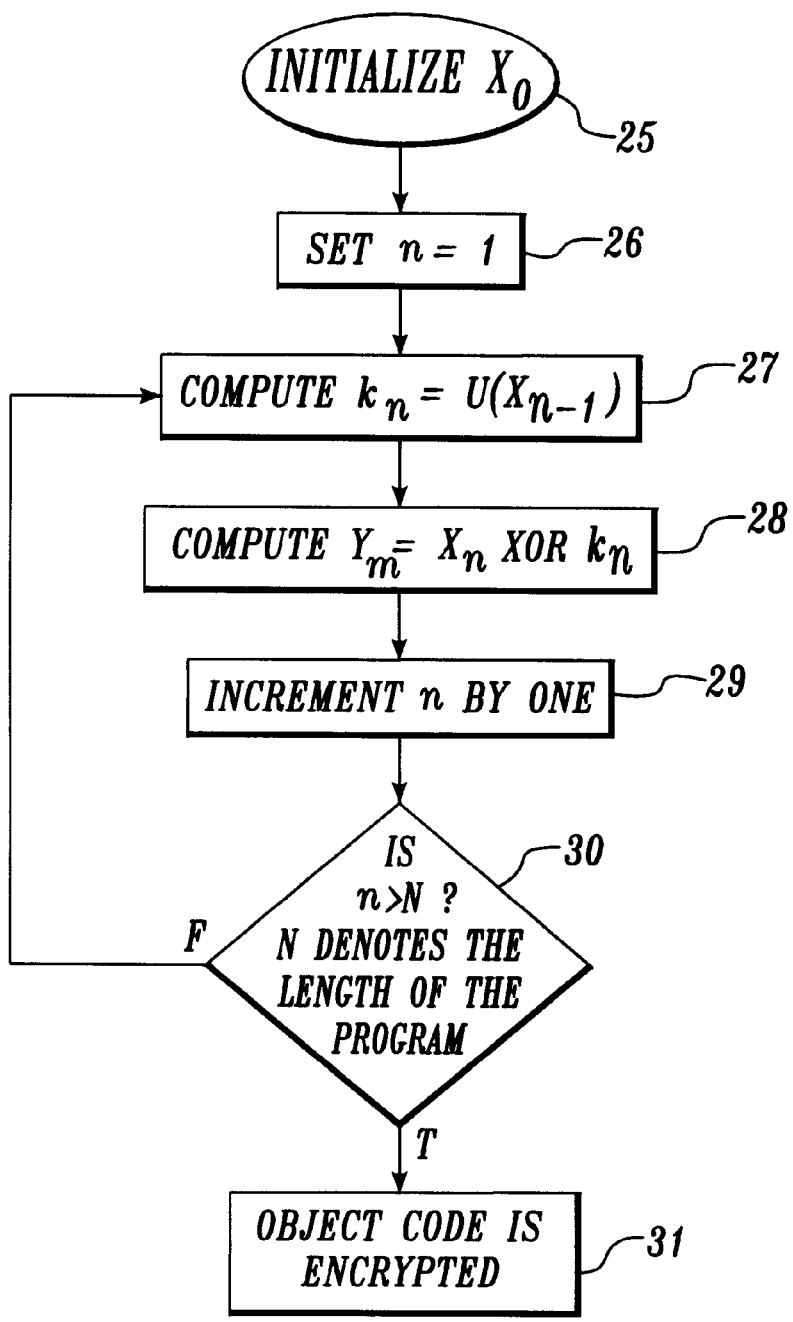
FIG. 12 is a flowgraph of the process to encrypt an object code to an encrypted code.

FIGS. 11A–11B show a basic example of the transform devices 10 or 18 and the routing connections of the permutators 12 or 20. In this example, the bit width of the object code is three, with b=3, and the transformed encrypted code is one bit wide, with q=1. The length of the software program is five, with N=5. The sequence of object codes $X_n$ contain values of $X_1=101$, $X_2=110$, $X_3=111$, $X_4=000$, and $X_5=011$, while setting $X_0=011$. The decryption circuit decrypts the encrypted codes and the above parameters as follows:

For n=1,
 $k_1 = U(011) = 010$
 $Y_1 = X_1 \oplus k_1 = 101 \oplus 010 = 111$
For n=2,
 $k_2 = U(101) = 010$
 $Y_2 = X_2 \oplus k_2 = 110 \oplus 010 = 100$
For n=3,
 $k_3 = U(110) = 010$
 $Y_3 = X_3 \oplus k_3 = 111 \oplus 010 = 101$
For n=4,
 $k_4 = U(111) = 010$
 $Y_4 = X_4 \oplus k_4 = 000 \oplus 010 = 010$
For n=5,
 $k_5 = U(000) = 000$
 $Y_5 = X_5 \oplus k_5 = 011 \oplus 000 = 011$ Referring now to FIG. 12, there is shown a flowgraph of the process to encrypt an object code to an encrypted code. At step 25, the first value of a sequence of object codes $X_n$ is initialized. The value of n is set to the numerical value of one in step 26. At step 27, the decryption circuit 15 computes the dynamic keys, with $k_n = U(X_{n-1})$. At step 28, the decoder 15 computes a sequence of encrypted codes $Y_n = X_n$ XOR $K_n$ such that a value of m in $Y_n$ is selected which is less is less than a value of n in $X_n$. At step 29, the value of n is incremented by one. At step 30, let N denotes the length of the program, if n does not greater than N, then the program returns to step 27, but if the n equals to N, then at step 31, the sequence of object codes $X_n$ has been encrypted to the sequence of encrypted codes $Y_m$.

FIG. 13 is a table showing the permutations from one-bit to eight-bit for a bit reverse technique, an inversible transform technique, a non-inversible transform, and the present method and system. If an object code $X_n$ contains b bits, then the bit reverse method provides $2^b$ possible combinations of keys from its one-to-one mapping scheme. The inversible transform method offers greater resistance from its multiple-to-one mapping scheme with $2^b!$ or mathematically equivalent to $2^b \times (2^b-1) \times (2^b-2) \ldots 2 \times 1$ permutations of keys. Although the non-inversible transform method offer even greater than resistance with the $2^{b2^b}-2^b!$ permutations, it cannot be used to encrypt an object code since no inverse transform exists to decrypt back the original data. This invention offers greater resistance to withstand cryptoanalytic attack with permutations of $2^b\{2^{b2^b}-2^b!\}$, which represents the bit reverse method combinations of $2^b$, combine the non-inverse transform combinations of $(2^{b2^b})$, minus the inversible transform combinations of $2^b!$.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A system for encrypting a first sequence of binary codes $X_n$ in firmware from a combination of logic gates, comprising:

an encryption circuit for encrypting the first sequence of binary codes $X_n$ to generate a second sequence of binary codes $Y_n$ using a predetermined single key $X_0$ and a sequence of dynamic keys $K_n$ possessing non-inversible transform characteristics, wherein the sequence of dynamic keys being generated as $K_n=U(X_{n-1})$, the second sequence of codes $Y_n$ being encrypted as $Y_n=X_n \oplus K_n$; and a decryption circuit for decrypting the second sequence of binary codes $Y_n$ to produce the first sequence of binary codes $X_n$ wherein $X_n=Y_n \oplus K_n$.

2. The system of claim 1 wherein the non-inversible characteristics comprises a multiple-to-one mapping from the first sequence of binary codes $X_n$ to the second sequence of binary codes $Y_n$, such that a numerical value of m in $Z_m$ is less than a numerical value of n in $X_n$.

3. The system of claim 2 wherein the encryption circuit further comprising a transform device having inputs with b bits and outputs with q bits, the transform device performing a multiple-to-one mapping from the inputs having b bits to the outputs having q bits to generate a transformed codes, the transformed device being constructed using the combination of logic gates.

4. The system of claim 3 wherein the encryption circuit further comprising a plurality of registers having inputs coupled to the output of the transform device and outputs, each register having an input connected to a corresponding one of outputs of the transformed device, the plurality of registers generating one-clock-cycle delay to the transformed code.

5. The system of claim 4 wherein the encryption circuit further comprising a permutator having inputs with q bits and outputs with b bits, the inputs of the permutator coupled to a corresponding one of the outputs of the plurality of registers, the permutator converting the inputs having q bits to the outputs having b bits.

6. The system of claim 5 wherein the encryption circuit further comprising an exclusive-OR gate, the exclusive-OR gate having a first input coupled to the outputs of the permutator, a second input for receiving the first sequence of codes $X_n$, and an output for generating the second sequence of codes $Y_m$.

7. The system of claim 3 wherein the transform device comprises a resident device that resides inside of the system and a mobile device that is portable.

8. The system of claim 7 wherein the resident device contains a portion of the combination of logic gates in the transform device.

9. The system of claim 7 wherein the mobile device contains a portion of the combination of logic gates in the transform device.

10. The system of claim 2 wherein the decryption circuit further comprising a transform device having inputs with b bits and outputs with q bits, the transform device performs a multiple-to-one mapping from the inputs having b bits to the outputs having q bits to generate a transformed code, the transformed device being constructed using logic gates.

11. The system of claim 10 wherein the decryption circuit further comprising a plurality of registers having inputs coupled to the transform device and outputs, each register having an input connected to a corresponding one of outputs of the transformed device, the plurality of registers producing one-clock-cycle delay to the transformed code.

12. The system of claim 11 wherein the decryption circuit further comprising a permutator having inputs with q bits and outputs with b bits, the inputs of the permutator coupled to a corresponding one of the outputs of the plurality of registers, the permutator converting the inputs having q bits to the outputs having b bits.

13. The system of claim 12 wherein the decryption circuit further comprising an exclusive-OR gate, the exclusive-OR gate having a first input coupled to the outputs of the permutator, a second input for receiving the second sequence of codes $Y_m$, and an output coupled the inputs of the transformed device of the decryption circuit and for generating the first sequence of codes $X_n$.

14. The system of claim 13 wherein the transform device comprises a resident device that resides inside of the system and a mobile device that is portable.

15. The system of claim 14 wherein the resident device contains a portion of the combination of logic gates in the transform device.

16. The system of claim 14 wherein the mobile device contains a portion of the combination of logic gates in the transform device.

17. The system of claim 3 or 10 wherein the transformed code comprises a singular binary bit and a plurality of binary bits.

18. A method for protecting information in firmware, comprising the steps of:

generating a first sequence of binary codes $X_n$;

initializing a single key $X_0$ in the first sequence of binary codes $X_n$;

computing a sequence of dynamic keys $K_n$ from the single key $X_0$, wherein $K_n=U(X_{n-1})$ such that U contains non-inversible transform characteristics; and encrypting a second sequence of binary codes $Y_n$ wherein $Y_n=X_n \oplus K_n$.

19. The method of claim 18 wherein the non-inversible characteristics comprise performing a multiple-to-one mapping from the first sequence of binary codes $X_n$ to the second sequence of binary codes $Z_m$ such that a value of m in $Z_m$ is less than a value of n in $X_n$.

20. The method of claim 19 further comprising the step of setting a counter variable n to a value of one.

21. The method of claim 20 further comprising the step of setting a predetermined value for a program length N.

22. The method of claim 21 further comprising the step of incrementing the value of the counter variable n by one if the value of the program length N is less than the value of the counter variable n.

23. The method of claim 18 further comprising decrypting the first sequence of binary codes $X_n$ wherein $X_n=Y_n \oplus K_n$.

24. A method for decrypting information in firmware, comprising the steps of:

generating a first sequence of binary codes $X_n$;

initializing a single key $X_0$ in the first sequence of binary codes $X_n$;

computing a sequence of dynamic keys $K_n$ from the single key $X_0$, wherein $K_n=U(X_{n-1})$ such that U contains non-inversible transform characteristics which create a multiple-to-one mapping from the first sequence of binary codes $X_n$ to the second sequence of binary codes $Y_m$ having a value of m in $Y_m$ less than a value of n in $X_n$; and decrypting the first sequence of binary codes $X_n$ wherein $X_n=Y_m \oplus K_n$.

* * * * *